United States Patent [19]

Kienzle et al.

[11] Patent Number: 5,184,509

[45] Date of Patent: Feb. 9, 1993

[54] METHOD AND APPARATUS FOR MEASURING THE AIR FLOW IN THE AIR INTAKE PASSAGE OF AN INTERNAL COMBUSTION ENGINE

[75] Inventors: Wolfgang Kienzle, Hemmingen; Josef Kleinhans, Ludwigsburg, both of Fed. Rep. of Germany

[73] Assignee: Robert Bosch GmbH, Stuttgart, Fed. Rep. of Germany

[21] Appl. No.: 641,689

[22] Filed: Jan. 16, 1991

Related U.S. Application Data

[63] Continuation-in-part of Ser. No. 150,662, Dec. 10, 1987.

[30] Foreign Application Priority Data

May 9, 1986 [DE] Fed. Rep. of Germany ....... 3615628

[51] Int. Cl.$^5$ .............................................. G01F 1/68
[52] U.S. Cl. ............................. 73/204.14; 73/204.16
[58] Field of Search ............ 73/118.1, 204.14, 204.15, 73/204.16, 204.17

[56] References Cited

U.S. PATENT DOCUMENTS

| 2,972,885 | 2/1961 | Laub | 73/204.14 |
| 3,683,692 | 8/1972 | Lafitte | 73/204.14 X |
| 3,828,332 | 8/1974 | Rekai | 73/204.14 X |
| 4,043,195 | 8/1977 | Hunting | 73/204.14 |

Primary Examiner—Herbert Goldstein
Attorney, Agent, or Firm—Michael J. Striker

[57] ABSTRACT

A method and a circuit arrangement for measuring the air flow in the air intake passage of an internal combustion engine provide an output pulse signal which can be easily processed in digital control devices. The unbalance voltage of a measuring bridge, which is thermally coupled with a flow measuring member, is supplied to a voltage-to-frequency converter; a frequency which is proportional to the unbalance voltage of the bridge circuit is provided at the output of the voltage-to-frequency converter for further processing. At the same time, this frequency is used for triggering a monostable multivibrator which connects the flow measuring member with a voltage source in a timed manner.

4 Claims, 2 Drawing Sheets

METHOD AND APPARATUS FOR MEASURING THE AIR FLOW IN THE AIR INTAKE PASSAGE OF AN INTERNAL COMBUSTION ENGINE

CROSS-REFERENCE TO A RELATED APPLICATION

This application is a continuation-in-part of application Ser. No. 150,662 filed on Dec. 10, 1987.

PRIOR ART

The invention is based on a method and a circuit arrangement for measuring the air flow in the air intake passage of an internal combustion engine having an air flow measuring member which is not sensitive to direction, particularly hot wire or heating film which is thermally coupled with a bridge branch of a resistance measuring bridge. Such methods and circuit arrangements provide an analog signal at the diagonal of the measuring bridge for purposes of further evaluation and control. However, analog signals cannot be utilized without additional measures in the digital control devices frequently used at the present time for controlling internal combustion engines. In addition, in the known methods and devices for measuring air flow, the flow measuring member is constantly connected with the operating voltage source or a reference voltage source. This has proven unsatisfactory in certain cases of application, since particular heat dissipation problems must be overcome.

In another known device for measuring the air flow, a direct-current component permanently flows through a temperature-dependent resistor, and an additional current component, whose level changes periodically, being superimposed on this direct-current component. This additional current component is fed to the temperature-dependent resistor via a power semiconductor. The direct-current component, which is constantly present, also leads to an undesired power loss. In order to generate an input voltage suitable for the voltage-to-frequency conversion, an integrator must be provided for smoothing the clocked voltage components which are fed to the measuring bridge, this integrator because of its relatively high integrator time constant degrading the dynamic behavior of the measuring system.

ADVANTAGES OF THE INVENTION

Compared with known methods and circuit arrangements, the method and the respective circuit arrangement for measuring the air flow in the air intake passage of an internal combustion engine, according to the invention, have the advantage that the output signal, which has a frequency, is directly acceptable in a control device constructed according to digital technology, so that there is no need for further circuits for converting the analog signal into digital form.

In addition, a substantially reduced thermal load results by means of the timed or pulse operation of the flow measuring member compared to analog operation, so that even critical heat dissipation problems are more easily overcome in practice.

Other advantages of the invention follow from the following description of the embodiment examples.

Embodiment examples of the invention are shown in the drawing and are described and explained in more detail in the following description of preferred embodiments.

DESCRIPTION OF THE EMBODIMENT EXAMPLES

Figure 1:
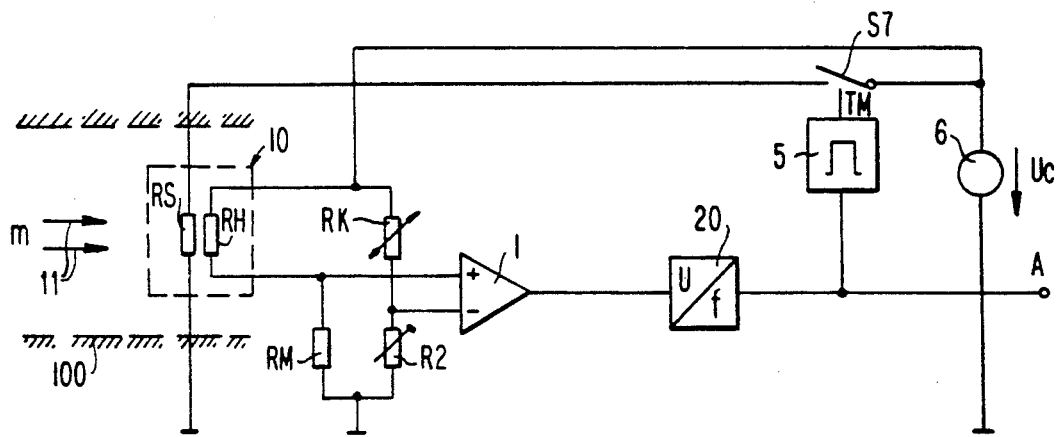
FIG. 1 shows a block diagram of a circuit arrangement for implementing the inventive method.

FIG. 1 shows a first circuit arrangement for implementing the method, according to the invention, shown as a block diagram.

The air flow sensing member 10 consists of a hot wire resistor or a heating film resistor RS which is thermally coupled with a high-resistance temperature-dependent resistor RH. The hot wire resistor RS is arranged in an air intake passage 100 of an internal combustion engine, which air intake passage 100 is shown only in a schematic manner; the air mass m flows against this flow sensing member from the direction of arrow 11 and the hot wire resistor RS can be connected with the operating voltage source 6 by means of a switch S7. The temperature-dependent resistor RH is in a bridge branch of a measuring bridge RH, RK, RM, R2. The measuring bridge is fed by the operating voltage source 6 with a voltage $U_C$ which is as constant as possible. Two diagonally opposite junction points of the bridge are connected respectively with the inverting and non-inverting input terminals of an operational amplifier 1 which amplifies the unbalance voltage of the measuring bridge. At the output of the operational amplifier 1 is connected a voltage-to-frequency converter 20 which converts the amplified unbalance voltage U of the measuring bridge into a frequency which is proportional to the voltage U. Accordingly, a frequency is provided at the output A of the voltage-to-frequency converter which characterizes the thermal state of the air flow sensing member 10 and can be further processed in a simple manner in a control device designed in digital technology.

A monostable multivibrator (monovibrator) 5 in its switched-on state actuates the switch S7 which connects the operating voltage source 6 with the flow measuring member RS so that heating current flows through the latter.

The air quantity m, which flows in the air intake passage 100 from the direction of arrow 11, cools the flow sensing member 10, so that the air quantity flowing through the passage can be determined by means of the temperature measurement or the control of the supplied energy.

The operational amplifier 1 regulates the previously described feed back circuit in such a way that its input voltage possibly assumes the value 0. The following equations result from this:

$$RH = \frac{RK}{R2} \cdot RM \qquad (1)$$

The following is true for RH:

$$RH = RHO\,(1 + aH \cdot TH) \qquad (2)$$

wherein RHO is resistance value of RH at room temperature,

H is temperature coefficient of RH, and TH is excess temperature of RH. In the stationary case, the excess temperature TH of the temperature sensor RH is equal to the excess temperature of the hot, wire resistor RS, the following equation describes its dependence on temperature:

$$RS = RSO (1 + \alpha S \cdot TS) \quad (3)$$

wherein RSO is resistance value or RS at room temperature,

S is temperature coefficient of RS and TS is excess temperature of RS. The hot wire resistor RS is heated by means of voltage pulses which are supplied to it from the voltage source 6 in the closed position of the switch 7, which is actuated by the monostable multivibrator 5, and is cooled by means of the air m flowing against it.

In the stationary case, the following applies to the energy balance according to King's formula:

$$PE = \frac{1}{T} \int_0^{TM} \frac{U_C^2}{RS} \cdot dt \quad (4)$$

or $$\overline{PE} = g \cdot (m) \, TS \quad (5)$$

In equation (4), $\overline{PE}$ designates the average value of the electric output converted in RS in the stationary case, T is time, TM is time interval in which the switch S7 is in its closed position, and $U_C$ is constant voltage applied to RS. In equation (5), $\overline{PE}$ corresponds to the average value of the thermal output carried off by the air, and g is a function of the air mass m. The following applies based on the behavior of the regulating circuit:

$$RH = \frac{RK}{R2} \cdot RM = \text{const.} \quad (6)$$

Thus:

$$TH = \text{const.} \quad (7)$$

and $$TS = TH = \text{const.} \quad (8)$$

and $$RS = \text{const.} \quad (9)$$

The following results in turn:

$$\frac{TM}{T} \cdot \frac{U_C^2}{R2} = g(\dot{m}) \cdot TS \quad (10)$$

Accordingly, with the equation:

$$T = \frac{1}{f}, \text{ wherein } f \text{ is frequency,} \quad (11)$$

the following applies:

$$f \cdot TM \cdot \frac{U_C^2}{RS} = g(m) \cdot TS \quad (12)$$

or $$f = \frac{1}{TM} \cdot \frac{U_C^2}{RS} \cdot TS \cdot g(m), \quad (13)$$

wherein k is a proportion constant. This means that the output frequency f provided by the voltage-to-frequency converter 20 is a measurement for the air mass flowing through the air intake passage 100.

When the monostable multivibrator 5 is triggered at the frequency f by means of the output signal of the voltage-to-frequency converter 20 and, accordingly, the pulse or clock-controlled switching on of the switch 7 takes place, the following applies for the keying ratio or pulse-duty factor:

$$v = \frac{TM}{T} = f \cdot TM \quad (14)$$

At the hot wire resistor RS, the average converted power is $$PE = v \cdot \frac{U_C^2}{RS} \quad (15)$$

At the bridge resistor RH, the converted power is $$PH = PGES - PE = v \cdot UB \frac{U_C}{RS} - \quad (16)$$

$$v \cdot \frac{U_C^2}{RS} = v \cdot \frac{U_C}{RS} (UB - U_C),$$

wherein PGES is total power and UB is the main supply voltage. In the case of analog operation of the flow measuring member, the following power consideration applies, while taking into consideration the voltage US across RS.

Power converted at the hot wire resistor RS:

$$PE = \frac{(US)^2}{RS} \quad (17)$$

The following applies for the converted power at RH:

$$PH = PGES - PE \quad (18)$$
$$= \frac{UB \cdot US}{RS} - \frac{(US)^2}{RS}$$
$$= \frac{US}{RS} (UB - US)$$

In both cases considered above, the resistance of the flow sensing member must be equal to RS when the temperature TS is the same. At the same time, the electrical power fed to the flow sensing member must agree in both cases. The following equation results:

$$\frac{(US)^2}{RS} = v \cdot \frac{U_C^2}{RS} \quad \text{or} \quad (19)$$

-continued $$S = \sqrt{v} \cdot U_C. \quad (20)$$

Accordingly, the following applies for the relationship of the power losses occurring at the resistor RH in both of the cases considered above:

$$\frac{PH(\text{pulse frequency})}{PH(\text{analog})} = \frac{v \cdot U_C}{RS} \cdot \frac{(UB - U_C)}{(US(UB - US))} \cdot RS \quad (21)$$

$$= \frac{v \cdot U_C(UB - U_C)}{\sqrt{v} \cdot U_C(UB - \sqrt{v} \, U_C)}$$

$$= \sqrt{v} \cdot \frac{UB - U_C}{UB - \sqrt{v} \cdot U_C}$$

For $$U_C > US, \quad (22)$$

the power converted in RH during clock-controlled operation is always less than in analog operation. This is also true particularly with small air flow rates and the poor cooling effect which goes along with them, so the clock-controlled operation of the flow sensing member 10 offers particular advantages.

Figure 3:
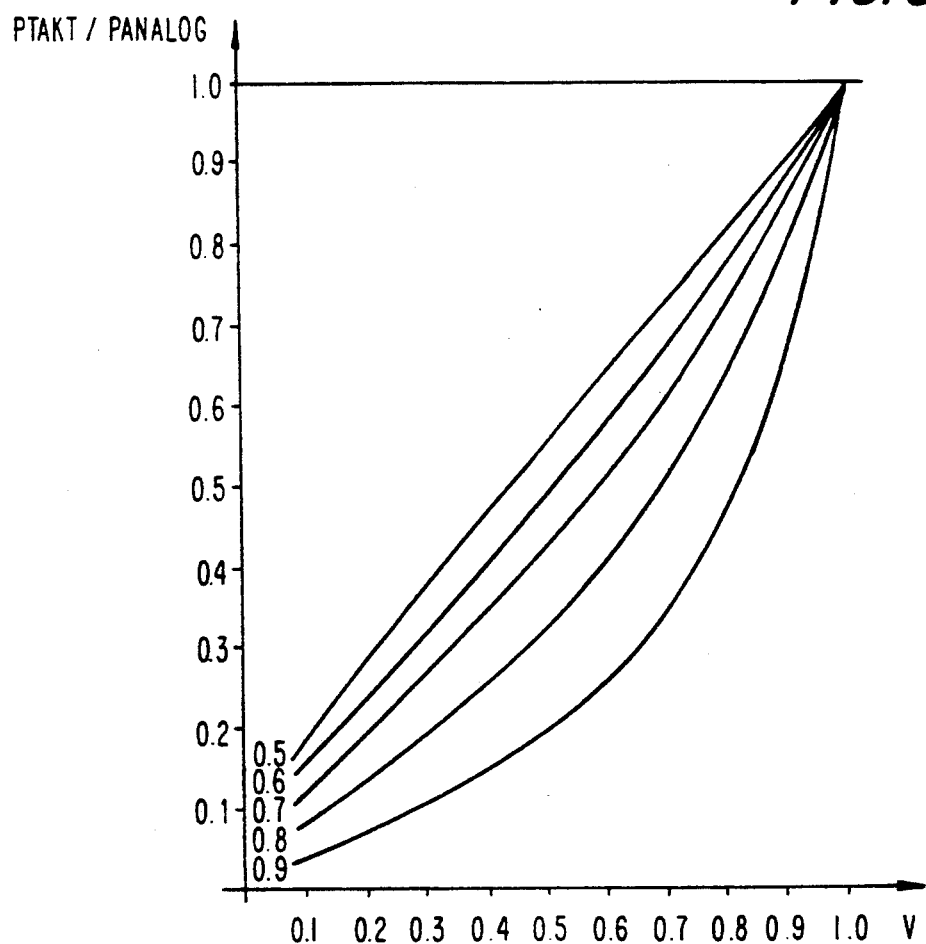
FIG. 3 shows a diagram to illustrate the lower thermal load in the pulse operation of the air flow sensing member.

These relationships can be read very clearly from the curves of the diagram according to FIG. 3, in that the power relationship PTAKT/PANALOG between the clock-controlled and analog operation is shown as a function of the pulse duty factor γ with UR/UB (e.g., 0.5, 0.6, 0.7) as parameter. The regulating voltage UR=the constant voltage $U_C$ and UB is the main supply voltage.

The voltage $U_C$, which is supplied to the hot wire resistor RS, should be selected so as to be as high as possible for reasons relating to power losses.

Figure 2:
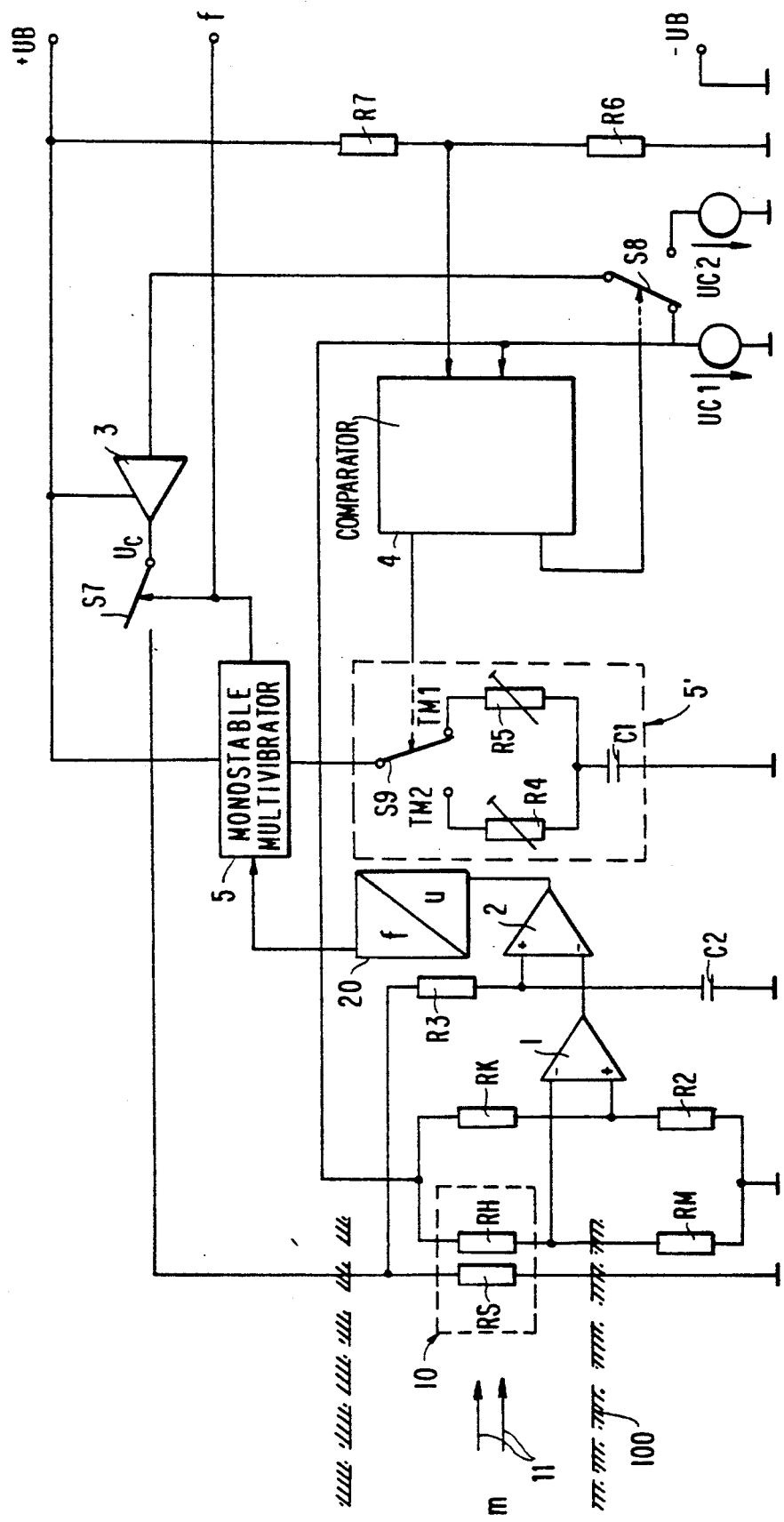
FIG. 2 shows another embodiment example of the circuit arrangement of the invention with switching capability for different timing elements of a monostable multivibrator.

However, when the battery or main supply voltage UB is low, the voltage is no longer sufficient when the air mass flow is large. As an alternative, the resistor RS is clocked with pulses at a different constant voltage during low battery voltage than when the battery voltage is sufficiently high. In order to prevent the occurrence of a bend of the characteristic during the switching of the constant voltages, which would make it more difficult to further process the measurement signals, the clocked power, which is converted in RS, must be equally great in both of the cases discussed above. This is achieved in an advantageous development of the invention by means of a corresponding change of the switch-on duration TM of the monostable multivibrator 5. A circuit arrangement which is suitable for this purpose is shown in FIG. 2. Depending on switching positions of switches S8 and S9, the following equations apply:

For $U_C = UC1$, $TM = TM1$. (23)

For $U_C = UC2$, $TM = TM2$, (24)

wherein UC1 and UC2 are different constant voltages, and TM1 and TM2 are values of TM (i.e. closing time interval of S7) assigned to UC1 or UC2.

The following results for the output at RS:

$$PE = f \cdot TM \cdot \frac{U_C^2}{RS} = \text{const.} \quad (25)$$

The following results with (23) or (24);

$$f \cdot TM1 \cdot \frac{(UC1)^2}{RS} = f \cdot TM2 \cdot \frac{(UC2)^2}{RS} \quad (26)$$

and $$\frac{TM1}{TM2} = \frac{(UC2)^2}{(UC1)^2} \quad (27)$$

A circuit arrangement suitable for the switching of the constant voltage $U_C$ is shown in FIG. 2. Its function corresponds substantially to the circuit arrangement shown in FIG. 1. In addition, it comprises means which are capable of determining supply voltage fluctuations, particularly a battery or main supply voltage +UB, which is too low, and then switching between the two different constant voltages UC1 and UC2 in order to supply the hot wire resistor RS. These means comprise a comparator 4 and a switch S8. Switch S7, which connects RS with the constant voltage UC1 or UC2, is actuated by the monostable multivibrator 5. If necessary, a power amplifier 3 is connected between RS and the sources of constant voltages UC1 and UC2.

In order to prevent a bend of the characteristic resulting from switching between the two constant voltages UC1 and UC2, which would unnecessarily complicate the evaluation of the measurement results, it is ensured that the same electrical power is always switched in RS, also when the voltage sources change. This is effected in a simple manner in that switchable timing elements 5' are provided which influence the switching behavior of the monostable multi-vibrator 5. As indicated in FIG. 2, these timing elements consist of a capacitor C1 and two different variable resistors R4 and R5, each of which can be switched on by means of the switch S9, which is likewise actuated by the comparator (4). As already mentioned, FIG. 3 shows a diagram to illustrate the lower thermal load during clock operation of the flow measuring member.

We claim:

1. Method for measuring the air flow in the air intake passage of an internal combustion engine having an electric power supply, comprising the steps of directing the air flow against an electrically heated flow measuring member which is insensitive to direction of flow; thermally coupling said flow measuring member to a temperature-dependent branch of a resistance measuring bridge circuit; converting the unbalance voltage of said bridge circuit into an alternating signal having a frequency which is proportional to said unbalance voltage; periodically connecting at said frequency one of two sources of different constant voltages to said flow measuring member; sensing voltage level of said electric power supply; periodically connecting at said frequency the other source of constant voltage to said flow measuring member in response to a change of the sensed voltage level; and adjusting the duration of said periodic connections in dependency on said change of the sensed voltage level.

2. Method as defined in claim 1 wherein prior to said converting step the unbalance voltage is amplified, and said alternating signal triggering a monostable multivibrator which actuates a switch connecting said electric power supply to said flow measuring member.

3. Method as defined in claim 1 further comprising the steps of sensing lower voltage levels of said electric power supply and adjusting switched-on intervals of said monostable multivibrator in dependency on the sensed voltage level.

4. Circuit arrangement for measuring the air flow in the air intake passage of an internal combustion engine, comprising electrically heated flow measuring member arranged in said passage; a resistance measuring bridge circuit having a temperature-dependent branch thermally coupled to said flow measuring member; an electric power supply for energizing said flow measuring member and said bridge circuit; a voltage-to-frequency converter coupled via an amplifier to said bridge circuit to convert an unbalance voltage of the bridge circuit into an alternating signal at a frequency which is proportional to the unbalance voltage; a monostable multivibrator for controlling a switch connected between said electric power supply and said flow measuring member; means for applying said alternating signal to said multivibrator to trigger the same in synchronism with said frequency; means for sensing voltage level of said electric power supply; a plurality of timing elements for determining different switched-on time intervals of said monostable multivibrator in dependency on the sensed voltage level; a plurality of auxiliary power sources each having a different constant voltage; and means for connecting said flow measuring member to one of said auxiliary power sources in dependency on the sensed voltage level.

* * * * *